United States Patent

[11] 3,586,193

| [72] | Inventor | Keith Wilkinson<br>Hertfordshire, England |
|---|---|---|
| [21] | Appl. No. | 826,403 |
| [22] | Filed | May 21, 1969 |
| [45] | Patented | June 22, 1971 |
| [73] | Assignee | Geo. W. King Limited<br>Stevenage, England |
| [32] | Priority | May 21, 1968 |
| [33] | | Great Britain |
| [31] | | 24277/68 |

[54] MECHANICAL HANDLING EQUIPMENT
9 Claims, 2 Drawing Figs.

[52] U.S. Cl. ................................................ 214/711,
187/9, 187/81, 214/16.4
[51] Int. Cl. ........................................................ B65g 47/56
[50] Field of Search............................................ 214/16.4;
187/9, 81, 82, 85, 86

[56] References Cited
UNITED STATES PATENTS
822,538  6/1906  Morgan ........................  187/81

3,263,777  8/1966  Robichon ....................  214/16.4(2) X
3,343,692  9/1967  Arnot ..........................  198/157 X Primary Examiner—Gerald M. Forlenza
Assistant Examiner—George F. Abraham
Attorney—Roditi, Schwartz and Nissen ABSTRACT: An apparatus for use in transferring goods from a storage rack to a discharge point and comprising a mobile frame or chassis which is guided for reciprocation along a predetermined path extending across the face of a storage rack and carries an operator's cabin or platform which is capable of being raised and lowered so that it may be located at a selected level in relation to the rack, there being an elevator also mounted on the frame or chassis and operable independently of the cabin or platform, the arrangement being such that with the operator's cabin or platform set at a selected level the operator will be able to transfer goods from the rack to the elevator for transfer to a lower level at which such goods may then be transferred to a delivery conveyor.

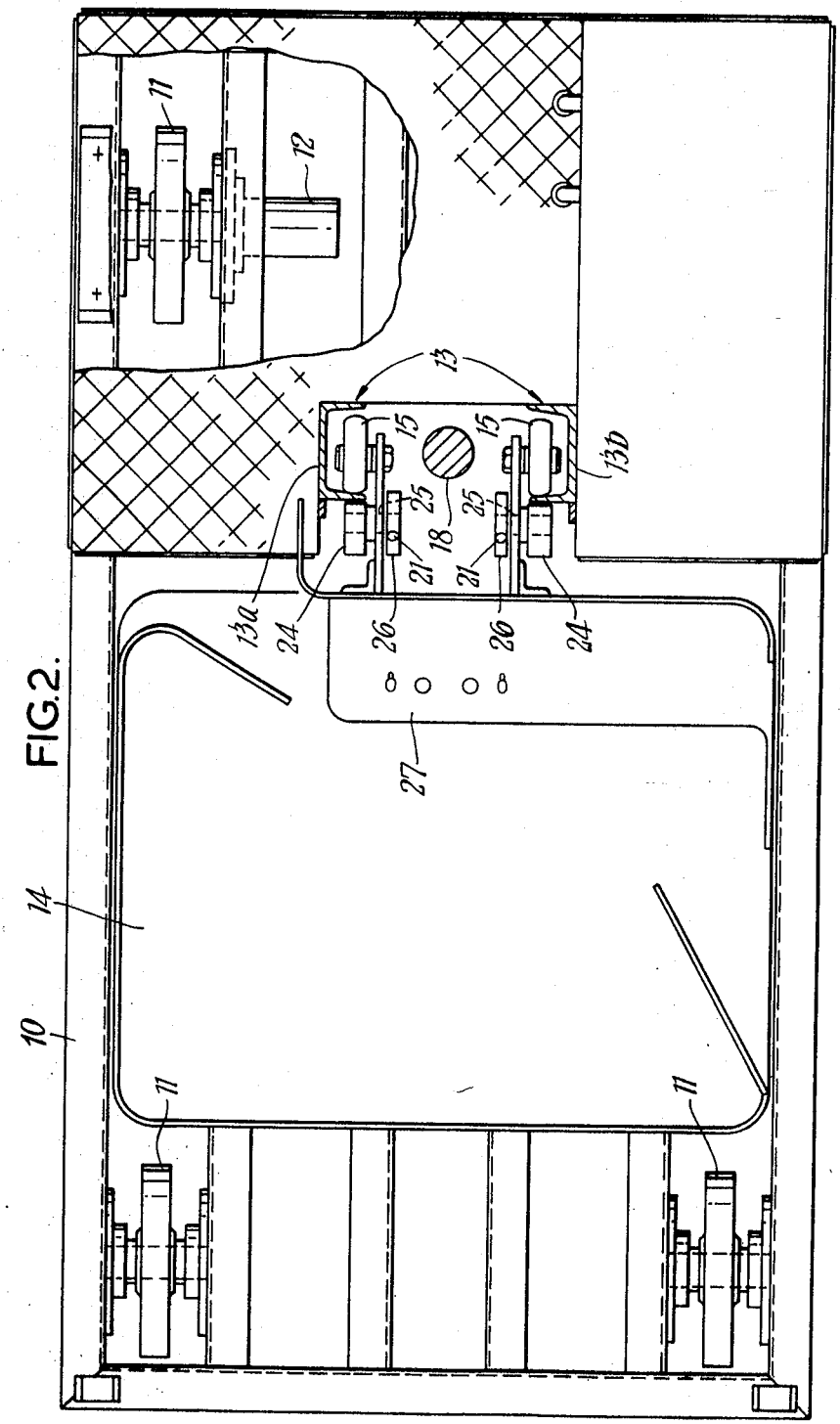

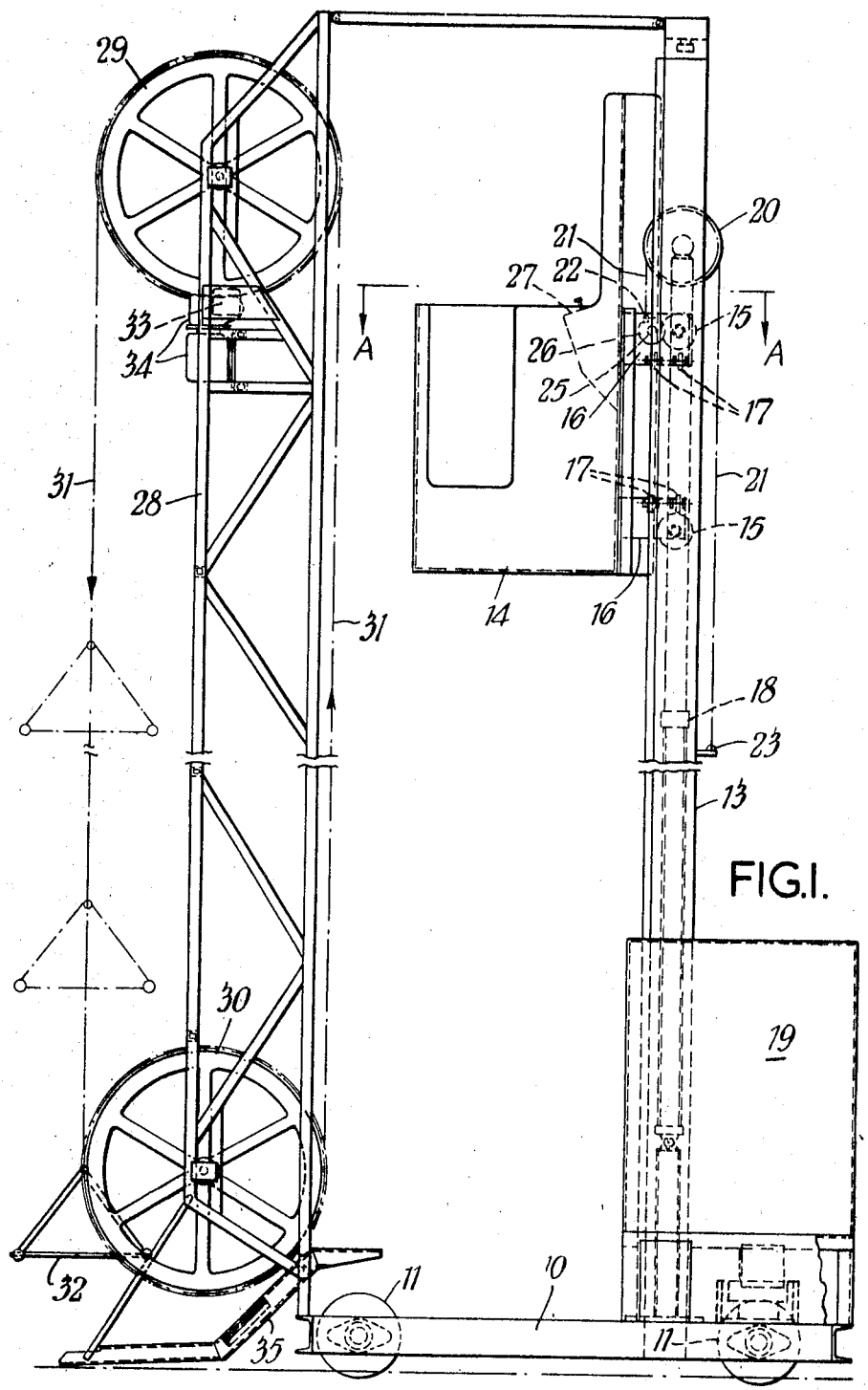
FIG.I.

MECHANICAL HANDLING EQUIPMENT

This invention is concerned with mechanical handling equipment and has for its chief object to provide an apparatus which is intended for use in warehouses or storage areas to facilitate transference of goods from a stored position to a delivery or collection point or vice versa.

Broadly in accordance with the invention there is provided an apparatus comprising a mobile frame or chassis, a vertical mast mounted on such frame or chassis, an operator's platform or cabin vertically reciprocable and capable of being positioned at any selected level along the latter, and elevator means also mounted on said frame or chassis and adapted on operation to convey goods from the level of the platform or cabin to a convenient lower level or vice versa. Preferably the frame or chassis will be mounted on wheels adapted to run on or in fixed rails or tracks extending between storage racks or the like and preferably also means are incorporated for driving at least certain of such wheels as and when required. The operator's platform or cabin may conveniently be vertically reciprocated by means of a medium of an hydraulic ram and associated supporting chain equipment while the elevator may comprise two endless driven chains which are arranged vertically in spaced parallel relation to serve to support between them at spaced points therealong a plurality of pivoted shelves or other load supporting means. At the lower end of the elevator, means may be provided adapted, as the shelves or load supporting means approach the lowermost point of their travel, to cause goods present on such shelves or means to be discharged therefrom automatically. Conveniently an endless belt or other appropriate type of conveyor will be appropriately positioned in relation to the path of travel of the apparatus so that goods discharged from the elevator will be deposited on such conveyor for transportation to a discharge or collecting station.

For a better understanding of the invention reference will now be made to the accompanying drawings which illustrate one possible constructional embodiment and in which:

FIG. 1 is a side elevational view of an apparatus in accordance with the invention, and FIG. 2 is a section on the line A–A of FIG. 1, the goods elevator being omitted.

Referring now to the drawing it will be seen that the apparatus comprises a main base frame 10 of rectangular form, such frame being supported on two pairs of wheels 11 which are adapted to run in channel section tracks on the floor. The tracks are positioned between storage racks so that the apparatus may be reciprocated along a gangway or alley between two racks. In the embodiment illustrated on pair of wheels 11 will be powered, a pair of hydraulic motor units, one of which as shown in FIG. 1 is indicated at 12, being provided for that purpose. Clearly instead of hydraulic drive units any other appropriate form of prime mover may be employed. Mounted at one end of the frame 10 is a rigid vertical mast 13, comprising, as can clearly be seen from FIG. 2, two channel section members 13a, 13b. The mast 13 serves to support and to provide a vertical track or runway for an operator's platform or cabin 14 the latter being equipped with an upper and a lower set of guide rollers 15 which are mounted for free rotation on brackets 16 and are arranged to run in the channel section members 13a, 13b of the mast 13. In addition the brackets 16 are equipped with further sets of guide rollers 17 which are freely rotatable about axes at right angles to those of rotation of the rollers 15 and are adapted to cooperate with the channel section members of the mast 13 in such a manner as to prevent any tendency to lateral movement of the platform or cabin relatively to said mast. The platform or cabin 14 is vertically reciprocable along the mast 13 by means of the medium of an hydraulic ram 18 and an associated supporting chain assembly. The ram 18 which is powered by means of an appropriate power unit of known type housed in a casing 19 is adapted to cooperate with a cross-head which is slidable vertically in the channel section members 13a, 13b and carries a pair of chain wheels 20. Passing around each chain wheel 20 is a chain 21 one end of which is effectively anchored to the cabin at 22 while the other end is anchored to a fixed anchorage 23 carried by the mast. On extension and retraction of the ram 18 the crosshead will move upwardly and downwardly, the chains 21 passing around the chain wheels 20 causing the latter to rotate idly. The chains 21 will effectively support the platform or cabin 14 which will be moved upwardly or downwardly as a result of projective and retractive movements of the ram. In order to ensure that the platform or cabin 14 will not fall or move downwardly in an uncontrolled manner in the event of breakage of failure of the chains 21 an appropriate safety mechanism is incorporated. In the embodiment illustrated such a safety mechanism comprises a pair of rollers 24 which are mounted for rotary or angular movement about eccentric axes and are adapted to cooperate respectively with each of the channel section members 13a, 13b of the mast 13. Each of the rollers 24 is fixedly mounted eccentrically on a stub shaft 25 which is rotatably journaled in suitable bearings carried by the appropriate bracket 16, each such shaft carrying a member 26 to which the appropriate chain 21 is coupled. The rollers 24 are biased by springs (not shown) which tend to urge them to rotate in an anticlockwise direction as shown in the drawing. The arrangement is such that normally the rollers 24 will be maintained by the chains 21 in the inoperative position shown in FIG. 2, but in the event of chain breakage with resultant tendency of the platform or cabin to fall, said rollers 24 will by virtue of their springs and then as a result of frictional engagement with the mast 13, be caused to rotate and thus to jam or wedge against the mast thereby to hold the platform or cabin against downward movement.

The operation of the power units for driving the wheels 11 and for actuating the ram 18 will conveniently be controlled by the operator from a control panel 27 located on or in the platform or cabin 14. If as indicated above hydraulic power units are employed the control may be effected by means of solenoid operated valves.

Mounted at that end of the frame 10 remote from the mast 13 is a pair of vertical lattice type frames 28 which are disposed in spaced relationship and serve to support an upper and a lower pair of chain wheels 29, 30 respectively. The pairs of chain wheels 29, 30 support two endless chains 31 which are disposed in spaced parallel relation. Mounted between the chains 31 and at spaced points therealong is a plurality of carrier or shelves which are capable of a pivotal movement and one of which is indicated at 32. In the embodiment illustrated the top chain wheels 29 are driven through the medium of friction drive means, such means comprising a friction drive wheel or pulley 33 cooperating with each wheel 29, such pulleys or wheels, which are mounted on a common shaft, being coated with a material having a high coefficient of friction. The common shaft carrying the friction wheels or pulleys 33 is driven from a motor and gear box assembly indicated at 34, the operation of the motor being controlled from the control panel 27 on or in the platform or cabin 14.

Disposed at the lower ends of the lattice frames 28 and below the lower chain wheels 30 are cam or ramp means for effecting tilting or tipping of the shelves as they approach the lowest point of their travel thereby to cause any goods present therein to be discharged therefrom. In the embodiment illustrated the tipping or tilting means comprises a pair of spaced ramp or cam members 35.

Conveniently a belt conveyor (not shown) will be disposed below the path of movement of the apparatus so that any goods discharged from the shelves 32 will be deposited on such conveyor and be moved away from the apparatus to an appropriate collection or delivery station. By arranging for the goods to be deposited on to a conveyor any possibility of congestion or accumulation of goods at the lower end of the elevator will be obviated.

In use the apparatus will be moved along the supporting tracks between storage racks to a selected position whereupon the platform or cabin 14 may be moved vertically so that the operator thereon or therein will be conveniently positioned in relation to a selected shelf or bin in one of the racks. With the platform or cabin maintained in its selected position the operator will be able to remove goods from the storage rack and to deposite them on one or more of the shelves 32 for transportation to ground level. Due to the fact that the chains 31 will be driven, empty shelves 32 will be brought successively into an appropriate position in relation to the platform or cabin 14 so that the operator can easily place goods thereon. As each shelf approaches the lower end of its travel it will be tipped or tilted by the members 35 into such a position that any goods present thereon will be caused to slide off and on to the belt conveyor.

Although in the foregoing description reference has been made solely to the use of the apparatus for removing goods from storage it will be obvious that it might well be utilized to facilitate the packing or storage of goods in storage racks. In such a case goods for storage might be delivered to the base of the elevator by a conveyor and subsequently transferred to the shelves of the elevator whereby they would be conveyed to a point adjacent the platform or cabin for transference by the operator to a selected shelf or bin in a storage rack.

I claim:

1. Apparatus for transferring goods, said apparatus comprising a displaceable frame, means for displacing said frame horizontally, a displaceable platform for carrying an operator, means for displacing said platform vertically along said frame to position said platform at selected levels, an endless conveyor, support means for supporting the entire endless conveyor substantially vertically on said frame and opposite said platform, a plurality of carriers pivotally connected to said endless conveyor for carrying goods, drive means for driving said endless conveyor independently of the displacement of said platform to position a selected carrier opposite a selected level of said platform, and tilting means for tilting said carriers to discharge goods therefrom.

2. Apparatus as claimed in claim 1, wherein said endless conveyor is constituted by a pair of spaced endless chains, said support means including a pair of spaced upper rollers and a pair of spaced lower rollers rotatably mounted on said frame, said endless chains passing over both a respective upper and lower of said rollers.

3. Apparatus as claimed in claim 2, wherein said carriers each include opposite end portions pivotally connected to each of said endless chains respectively.

4. Apparatus as claimed in claim 1, wherein said frame includes a bottom portion, said tilting means being pivotally displaceable at said bottom portion of said frame for engaging said carriers.

5. Apparatus as claimed in claim 1, including control means on said platform for controlling the displacement of said platform and endless conveyor independently from one another.

6. Apparatus as in claim 1, in which a delivery conveyor is positioned to receive loads discharged from the carriers.

7. Apparatus as claimed in claim 1, including hydraulic means and a ram for displacing said platform vertically.

8. Apparatus as in claim 7, in which the ram is arranged with its longitudinal axis vertical and supports at its upper end a crosshead which is guided by said frame for vertical sliding movement and supports at least one freely rotatable chain wheel around which a chain passes, said chain being anchored at one end to the platform and at the other to a fixed anchorage on the frame structure.

9. Apparatus as in claim 8, in which the platform carries at least one safety roller which is arranged to cooperate with the frame and is mounted for rotation about an eccentric axis, said safety roller being coupled to the chain so that normally it will be maintained in an inoperative position, the arrangement being such that in the event of breakage of the chain said roller will be free to rotate and to wedge against the frame structure thereby to prevent uncontrolled downward movement of the platform.